US006265063B1

(12) United States Patent
Cordatos et al.

(10) Patent No.: US 6,265,063 B1
(45) Date of Patent: Jul. 24, 2001

(54) PAPERBOARD CARRIER FOR STATIC CLING APPLICATIONS

(75) Inventors: Haralambos Cordatos, Eldersburg, MD (US); David Hillis Hawes, Clifton Forge, VA (US)

(73) Assignee: Westvaco Corporation, Stamford, CT (US)

( * ) Notice: Subject to any disclaimer, the term of this patent is extended or adjusted under 35 U.S.C. 154(b) by 0 days.

(21) Appl. No.: 09/559,559

(22) Filed: Apr. 27, 2000

(51) Int. Cl.$^7$ ...................................................... B32B 29/04
(52) U.S. Cl. ..................... 428/342; 428/537.5; 428/537.7
(58) Field of Search ............................. 428/537.5, 500, 428/325, 330, 341, 342, 537.7

(56) References Cited

U.S. PATENT DOCUMENTS

| | | | |
|---|---|---|---|
| 4,109,056 | 8/1978 | Craig et al. | 428/512 |
| 4,209,584 | 6/1980 | Joseph | 430/527 |
| 4,348,455 | * 9/1982 | Clayton | 428/336 |
| 4,400,419 | 8/1983 | Laczynski | 428/40 |
| 4,475,969 | 10/1984 | Reed | 156/152 |
| 4,652,239 | 3/1987 | Brimberg | 434/80 |
| 4,701,360 | 10/1987 | Gibbons et al. | 428/35 |
| 4,777,088 | 10/1988 | Thompson et al. | 428/323 |
| 4,802,943 | 2/1989 | Gibbons et al. | 156/244.23 |
| 4,806,398 | 2/1989 | Martin, Jr. | 428/34.2 |
| 4,861,526 | 8/1989 | Gibbons et al. | 264/22 |
| 4,871,406 | 10/1989 | Griffith | 156/82 |
| 4,966,280 | 10/1990 | Bradford | 206/328 |
| 4,975,473 | 12/1990 | Kaneda et al. | 523/221 |
| 5,085,927 | * 2/1992 | Dohrer | 428/220 |
| 5,088,643 | 2/1992 | Frazier et al. | 229/125.15 |
| 5,098,497 | 3/1992 | Brinley | 156/219 |
| 5,102,171 | 4/1992 | Saetre | 283/117 |
| 5,116,649 | 5/1992 | Massouda | 428/34.2 |
| 5,161,687 | 11/1992 | Kornell et al. | 206/447 |
| 5,171,308 | 12/1992 | Gallagher et al. | 604/372 |
| 5,174,605 | 12/1992 | Instance | 281/5 |
| 5,302,402 | 4/1994 | Dudenhoeffer et al. | 426/129 |
| 5,334,431 | 8/1994 | Longtin | 428/40 |
| 5,361,904 | 11/1994 | Kapec et al. | 206/460 |
| 5,395,471 | 3/1995 | Obijeski et al. | 156/244.11 |
| 5,548,017 | 8/1996 | DiStefano | 524/514 |
| 5,643,388 | * 7/1997 | Peterson | 156/272.6 |
| 5,725,917 | 3/1998 | Parks | 428/34.2 |
| 5,888,615 | * 3/1999 | Mascarenhas et al. | 428/141 |
| 5,942,329 | * 8/1999 | Nakayama et al. | 428/423.1 |
| 6,015,044 | 1/2000 | Peterson | 206/460 |

FOREIGN PATENT DOCUMENTS

| | | |
|---|---|---|
| 2705378 | 8/1977 | (DE) . |
| 2821435 | 11/1979 | (DE) . |
| 0172142 | 8/1986 | (EP) . |
| 46-12082 | 3/1971 | (JP) . |
| 58-22134 | 2/1983 | (JP) . |
| 60-197740 | 10/1985 | (JP) . |
| 62-59037 | 3/1987 | (JP) . |
| 4-1043 | 1/1992 | (JP) . |
| 147327 | 10/1998 | (JP) . |

OTHER PUBLICATIONS

J.C. von der Heide & H.L. Wilson, "Guide to corona film treatment," Modern Plastics, May '61 pp. 119–206 & 344.
David A. Markgraf, "Corona Treatment," (an Overview), TAPPI Seminar Notes, 1986, P003504–P003510.

* cited by examiner

*Primary Examiner*—Harold Pyon
*Assistant Examiner*—Elena Tsoy
(74) *Attorney, Agent, or Firm*—Donald L. Bowman; Terry B. McDaniel; Richard L. Schmalz

(57) ABSTRACT

This invention relates to paperboard materials for carrying static cling vinyl products for transport to end users. Such structures of this type, generally, provide good adhesion for the static cling vinyl product, but allow the vinyl product to be peeled off easily.

11 Claims, No Drawings

PAPERBOARD CARRIER FOR STATIC CLING APPLICATIONS

BACKGROUND OF THE INVENTION

1. Field of the Invention

This invention relates to paperboard materials for carrying static cling vinyl products for transport to end users. Such structures of this type, generally, provide good adhesion for the static cling vinyl product, but allow the vinyl product to be peeled off easily.

2. Description of the Related Art

It is known to employ systems and assembly methods that utilize carriers for static cling. Exemplary of such prior art are U.S. Pat. No. 4,652,239 ('239) to B. J. Brimberg, entitled "Space Planning System and Method," U.S. Pat. No. 5,102,171 ('171) to R. S. Saetre, entitled "Static Cling Greeting Card," and U.S. Pat. No. 5,334,431 ('431) to A. G. Longtin, entitled "Piggyback Assembly of Static Cling Decal, Intermediate Layer and Adhesive Web."

It is also known, in current carriers for static cling vinyl products, to employ a glossy extrusion coated paperboard substrate. Exemplary of such prior art is commonly assigned U.S. Pat. No. 5,643,388 ('388) to R. S. Peterson, entitled "Process of Making Paperboard Carrier for Static Cling Vinyl Products."

It is apparent from the above that there exists a need in the art for a carrier for static cling vinyl products which is light weight through simplicity of parts and uniqueness of structure, and which at least equals the static cling characteristics of the known carriers, but which at the same time utilizes less expensive materials and processes. It is a purpose of this invention to fulfill this and other needs in the art in a manner more apparent to the skilled artisan once given the following disclosure.

SUMMARY OF THE INVENTION

Generally speaking, this invention fulfills these needs by providing a paperboard carrier for static cling vinyl products, comprising a paperboard substrate, a layer of particulate minerals located adjacent to the paperboard substrate, and a layer of styrene-butadiene-based latex located adjacent to the particulate mineral layer such that a static cling vinyl product can adhere to the latex layer.

In certain preferred embodiments, the particulate minerals include clay. Also, the latex layer must have a high butadiene content and a glass transition temperature of approximately 5° C.

In another further preferred embodiment, the paperboard carrier provides good adhesion for the static cling vinyl product, but allows the product to be easily peeled off.

The preferred carrier, according to this invention, offers the following advantages: excellent adhesion for static cling vinyl products; lightness in weight; ease of assembly; good stability; good durability; good economy; and ease of static cling vinyl product removal. In fact, in many of the preferred embodiments, these factors of excellent adhesion and ease of product removal are optimized to the extent that is considerably higher than heretofore achieved in prior, known carriers.

The above and other features of the present invention, which will become more apparent as the description proceeds, are best understood by considering the following detailed description.

DETAILED DESCRIPTION OF THE INVENTION

The paperboard substrate is typically a 0.009 inch thick sheet. Definitively, the term paperboard describes paper within the thickness range of 0.004 to 0.028 inches. It is to understood that the paperboard substrate may be formed from bleached pulp stock or recycled paperboard. The invention is relevant to the full scope of such a range applied to packaging and beyond.

The paperboard substrate, typically, receives on the side facing the latex coating a fluidized mixture of finely particulated minerals and binders as a smooth coating. Minerals such as clay and calcium carbonate are most frequently used. Successive densification and polishing by calendering finishes the mineral coating surface to a high degree of smoothness and a superior surface on which the latex coating is applied. It is also to be understood that the other side (the side not in contact with the latex coating) may also be coated with the particulate minerals.

The paperboard carrier is manufactured by the addition of a styrene-butadiene (SBR)-based latex to standard clay coated paperboard. This latex has a high butadiene content and glass transition temperature of ~5° C. This coating was identified by screening a number of different styrene-butadiene and acrylic latex coatings applied to the clay-coated side of a clay-coated paperboard substrate and other smooth substrates. Vinyl sheet adhesion was evaluated based on the following criteria:

1) Peel force must be between 4 and 40 g/in and must improve over time; and
2) The coating must not adhere to vinyl film upon delamination.

All coatings were applied at various dilutions (% solids: 12–50) and using conventional rods #0, 3, 6 and 12. The performance of each coating tested is summarized in Table 1, below.

TABLE 1

Performance of Coatings Applied onto Clay Side of Coated Paperboard

| Coating | % Solids | Results |
|---|---|---|
| 1 | 17.5, 25, 50 | Adhesion too strong-coating sticks to vinyl |
| 2 | 22.5, 45 | Adhesion too strong-coating sticks to vinyl |
| 3 | 25, 50 | Adhesion too strong-coating sticks to vinyl |
| 4 | 25, 50 | No adhesion |
| 5 | 25 | Initially ~9 g/in, sticks to vinyl over time |
| 6 | 50 | 5–6 g/in |
| 7 | 25 | 17–18 g/in |
| 8 | 17 | 4–5 g/in |
| 9 | 12.5 | >4 g/in (inadequate) |
| 10 | 50 | 4–5 g/in |
| 11 | 25 | 17–21 g/in |
| 12 | 17 | 11–12 g/in |

In general, all acrylic coatings tested resulted in very strong bonds and part of the coating adhered to the vinyl film upon delamination. This result was independent of dilution and the problem increased in magnitude as the time of contact between coating and vinyl film after lamination increased. Based on the styrene-butadiene latex coatings tested, there was a positive correlation between low glass transition temperature (Tg) and performance. For example, coatings 10 and 11 (Tg=5° C.) gave excellent performance, while coating 4 (Tg=19° C.) did not work, even though they have similar chemical nature. However, a low Tg is not sufficient for good performance in this application: for example coating 3 (Tg=8° C.) exhibited the same problems found with acrylic coatings because, in addition to low Tg, it has high tack.

All coatings performed best when applied at 25% solids using a conventional rod #0, resulting in an estimated coverage of 1–2 lb/3000 ft$^2$. of all the coatings tested, two had performance comparable to cast-coated paperboard, namely, coatings 6, 7, 8, 9, 10 and 11, which are RAP 371, manufactured by Dow Chemical of Midland, Mich. (coatings 6–9) and FC 1050, also manufactured by Dow Chemical (coatings 10 and 11). When applied to the clay-coated side of the paperboard substrate at 25% solids using rod #0, and laminated with static cling vinyl sheet, all exhibited 17–18 g/in initial peeling force, which is slightly better than that of cast-coated paperboard. Peel force increased 10–20% when tested 5–10 days after lamination.

Suitable coaters include blade, rod, or metered roll coaters. Any apparatus which gives a smooth, uniform application rate at less than 2 lb/3000 ft$^2$ dry weight is sufficient. For example, a ~0.5 μm (~0.3 lb/3000 ft$^2$) film of coatings 10, 11 and 12 was applied onto the clay-coated side of a paperboard substrate via a smooth rod. Adhesion of static cling vinyl film laminated samples to substrate coated at 600 and 1000 ft/min was equivalent to that of samples laminated onto cast-coated paperboard. Adhesion improved over time following lamination.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A vinyl product carrier comprising:
   a paperboard substrate;
   a layer of particulate minerals bonded to said paperboard substrate; and
   a layer of styrene-butadiene copolymer bonded to said layer of particulate minerals, wherein said layer of styrene-butadiene copolymer has a glass transition temperature of less than about 8° C.

2. The carrier, as in claim 1, wherein said layer of particulate minerals comprises clay.

3. The carrier, as in claim 1, wherein said layer of particulate minerals comprises calcium carbonate.

4. The carrier, as in claim 1, wherein said layer of styrene-butadiene copolymer has a coat weight of less than about 2 pounds/3000 ft$^2$ dry weight.

5. The carrier, as in claim 1, wherein styrene-butadiene copolymer has greater than about 10% by weight butadiene based on styrene butadiene copolymer.

6. A method of manufacturing a vinyl product carrier, comprising the steps of:
   providing a paperboard substrate;
   bonding a layer of particulate minerals to said paperboard substrate; and
   bonding a layer of styrene butadiene copolymer to said layer of particulate minerals, wherein said layer of styrene-butadiene copolymer has a glass transition temperature of less than about 8° C.

7. The method, as in claim 6, wherein said layer of particulate minerals comprises clay.

8. The method, as in claim 6, wherein said layer of particulate minerals comprises calcium carbonate.

9. The method, as in claim 6, wherein said layer of styrene-butadiene copolymer has a coat weight of less than about 2 pounds/3000 ft$^2$ dry weight.

10. The method, as in claim 6, wherein styrene-butadiene copolymer has greater than about 10% by weight butadiene based on styrene butadiene copolymer.

11. A method of carrying a vinyl product comprising the steps of:
   providing a vinyl product carrier wherein said vinyl product carrier comprises a paperboard substrate, a layer of particulate minerals bonded to said paperboard substrate, and a layer of styrene-butadiene copolymer bonded to said layer of particulate minerals, wherein said layer of styrene-butadiene copolymer has a glass transition temperature of less than about 8° C.; and
   securing a vinyl product to said vinyl product carrier.

\* \* \* \* \*